Figure 2A:
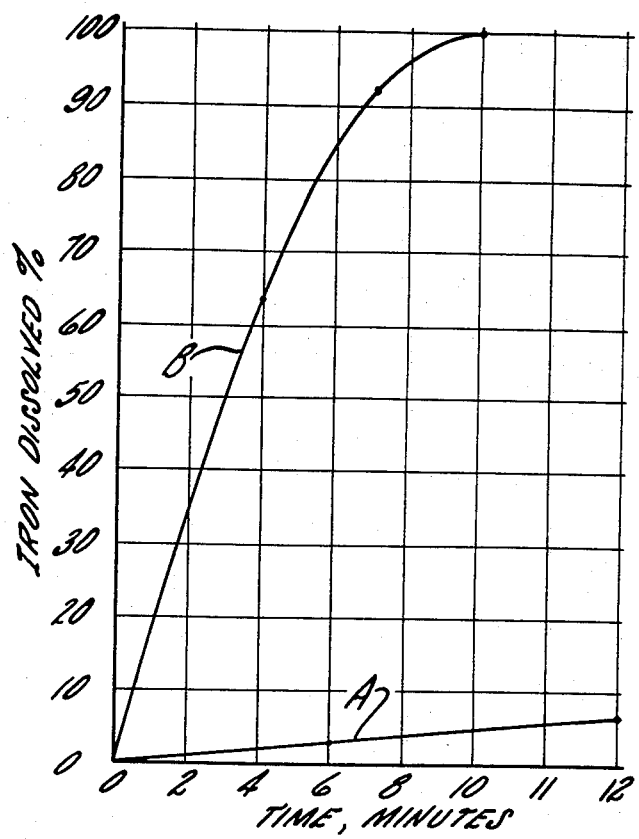

United States Patent [19]

Hach

[11] 3,709,662
[45] Jan. 9, 1973

[54] IRON ANALYSIS REAGENT FORMULATION

[75] Inventor: Clifford C. Hach, Ames, Iowa

[73] Assignee: Hach Chemical Company, Ames, Iowa

[22] Filed: July 20, 1970

[21] Appl. No.: 56,361

[52] U.S. Cl. ................................23/230 R, 252/408
[51] Int. Cl. ......................G01n 31/22, G01n 33/18
[58] Field of Search .................23/230, 253; 252/408

[56] References Cited

UNITED STATES PATENTS

| | | | |
|---|---|---|---|
| 3,506,404 | 4/1970 | Evans et al. | 23/230 R |
| 3,537,822 | 11/1970 | O'Malley et al. | 23/230 R |
| 3,506,403 | 4/1970 | Fryer et al. | 23/230 R |

OTHER PUBLICATIONS

Furman, N. H. ed., Standard Methods of Chemical Analysis, Vol. 1, p. 530 (1963)

Hackh's Chemical Dictionary, p. 676 (1965)
Lindsay, F. K. et al. Analytical Chemistry, Vol. 12, pp. 460–63 (1940)
Isbell, H. G., Analytical Chemistry, Vol. 4, pp. 284–86 (1932)

Primary Examiner—Morris O. Wolk
Assistant Examiner—R. M. Reese
Attorney—Wolfe, Hubbard, Leydig, Voit & Osann, Ltd.

[57] ABSTRACT

A single reagent formulation for use in the spectrophotometric determination of iron, which is capable of carrying out the multiple functions required in the spectrophotometric determination, comprises a solution of thioglycolic acid, a buffer to maintain the pH of the solution at a predetermined value or range and a ferroin reagent present in an amount effective to form a colored complex with the iron in a test sample. Superior solubilizing of the iron in a test sample is achieved when ammonium hydroxide serves as the buffer.

10 Claims, 2 Drawing Figures

INVENTOR.
CLIFFORD C. HACH
BY
Wolfe, Hubbard, Leydig, Voit & Osann
ATTORNEYS.

IRON ANALYSIS REAGENT FORMULATION

This invention relates to the quantitative analysis of iron and, more particularly, to a single reagent formulation characterized by its ability to carry out the multiple functions required in the spectrophotometric determination of iron.

It is desirable to quantitatively determine the presence of iron in a wide variety of applications. For example, it is necessary to continuously analyze for iron in the boiler water in a steam electric power generating plant because the iron oxide content of the boiler water is an index of the rate of corrosion taking place in the boiler.

As is typically carried out at present, the quantitative determination of iron involves solubilizing the solid iron compounds by adding to the sample an acid such as hydrochloric and then allowing time for the solid iron compounds to dissolve. Since almost all solid oxides of iron dissolve slowly at room temperatures, the solubilizing step is generally carried out by heating the sample containing the acid to boiling for a sufficient period of time to dissolve the iron compounds. Some iron oxides, such as $Fe_3O_4$ are extremely difficult to dissolve in dilute boiling acid solutions and many hours of boiling may be required to achieve solution. Accordingly, oxides of this type are generally dissolved by boiling with concentrated acid or mixtures of concentrated acids such as hydrochloric, nitric and perchloric acids.

The iron is then reduced to its ferrous form by adding to the sample solution, a reducing agent such as hydroxylammonium chloride. This step may be, and generally is, carried out in connection with the initial addition of hydrochloric acid.

A colorimetric reagent for iron is then added to the ferrous iron solution and the solution buffered to adjust the acidity and pH of the solution to the range in which the iron complex formed by the reagent and the ferrous ions is color responsive. The addition of the colorimetric reagent and the buffering of the solution may be carried out either together or separately.

While these determinations are of course carried out manually, continuous analyzing instruments are widely used. Such continuous analysis of iron is typically carried out by mixing an incoming sample at a specified rate with a minor proportion of solubilizing and reducing agents and then transporting to a chamber which is heated to effect the solubilizing. A second reagent solution, including the colorimetric reagent and the buffer, is then added and the solution cooled to about room temperature. The resulting solution is then transported to the colorimetric cell and the determination made.

The necessity for employing two separate reagents complicates the determination of the iron as well as the continuous apparatus which is employed. Additionally, the solubilizing step requires considerable time and impedes timely analyses.

It is accordingly an object of the present invention to provide a single reagent solution characterized by its ability to effect the multiple functions required in the spectrophotometric determination of iron. A more specific object provides a single reagent solution capable of solubilizing the iron, reducing to its ferrous form and forming a colored complex.

A further object of the present invention is to provide a reagent solution which is capable of increasing the dissolution rate of iron compounds, especially refractory oxides of iron.

Another and more specific object lies in the provision of a reagent solution which does not require the employment of heat, except for difficulty dissolvable refractory iron oxides. A related object provides a reagent wherein a single component provides both the buffering and an increase in the rate of dissolving of the iron compounds.

Figure 2B:
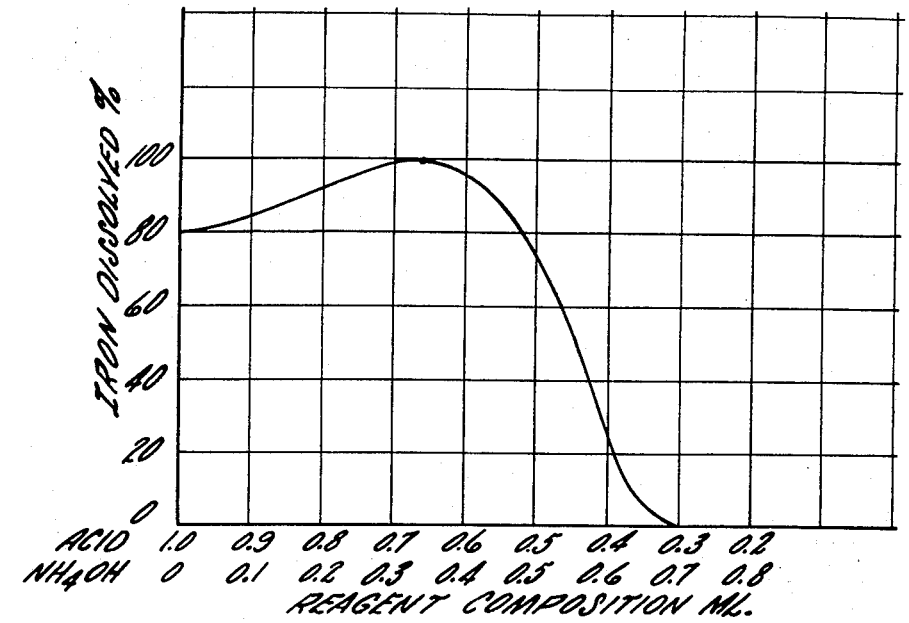

Other objects and advantages will become apparent as the following description proceeds taken in conjunction with the following drawings in which:

FIG. 1 is a graph of percent iron in a test sample that has been dissolved and colorimetrically determined plotted against time for two different reagent formulations which were added to the test samples, one of which embodies the present invention; and FIG. 2 is a graph of percent iron in a test sample that has been dissolved and colorimetrically determined plotted against the reagent formulation used to illustrate the optimum formulation for the composition of the present invention.

While the invention is susceptible of various modifications and alternative forms, certain specific embodiments thereof have been shown by way of example and will be described in detail herein. It should be understood, however, that it is not intended to limit the invention to the particular forms disclosed, but, on the contrary, the intention is to cover all modifications, equivalents and alternatives falling within the spirit and scope of the invention.

Briefly, and in accordance with the present invention, there is provided a single reagent solution which is capable of carrying out the functions which heretofore has required as many as four reagents, and never less than two separate reagents, and in more efficient manner. Thus, the reagent of the present invention includes a solution of thioglycolic acid, a buffer for the acid to maintain the pH within a predetermined range and a ferroin reagent present in an amount effective to form a colored complex with the iron in the sample being tested at the pH level. In the preferred embodiment, the buffer employed is ammonium hydroxide, which, in addition to its buffering, increases the rate of dissolving of the iron oxides.

To carry out an iron determination, about one volume of the reagent should be added to about 25 to 50 volumes of the test sample. The reagent solution can comprise from about 55 to about 80 volumes of 98 percent thioglycolic acid and from about 20 to about 45 volumes of a buffer, which is present in sufficient quantity to maintain a pH within the range of from about 3 to about 7, and a quantity of the ferroin reagent effective to form a colored complex with the ferrous iron in the sample. Any of the conventionally used buffers may be employed. Representative examples include various amines such as ethylenediamine, diethanolamine and amino methyl propanol and ammonium hydroxide.

With respect to the ferroin reagent, any conventional material can be employed. Representative examples of known ferroin reagents include 1,10-phenanthroline; 4,7-diphenyl-1,10-phenanthroline and 2,4,6-tris(2-pyridyl)-1,3,5-triazine. Others include 2,2' bypyridine and 2,2',2" tripyridine.

A particularly advantageous ferroin reagent is 3-(2-pyridyl)-5,6-bis(phenylsulfonic acid)-1,2,4-triazine (the principal product has the sulfonic acid groups located at the 4-position but minor amounts may be present having the acid groups located at other positions) or any of its soluble salts such as the disodium, dipotassium and diammonium salts, the corresponding mono salts, or mixtures thereof. These ferroin reagents and their methods of preparation are disclosed in the copending application of Stookey, entitled: "Ferroin Reagent and Methods of Making Same," Ser. No. 49,579, filed Jan. 24, 1970. Such reagents are soluble in water, low in cost, have a minimum of interference and a sensitivity which exceeds that of other commercially available reagents for iron. A colored complex with ferrous iron is formed at a pH of from about 4 to 9.

The ferroin reagent should be present in the reagent solution in an amount of from about 2 to about 10 grams/liter of the reagent solution. Functionally, the reagent should be present in an amount sufficient to complex together with the quantity of iron present in the test sample.

The preferred embodiment of the present invention comprises a reagent solution having two volumes of 98 percent thioglycolic acid, one volume of concentrated ammonium hydroxide and 5 grams/liter of the sodium salt of 3-(2-pyridyl)-5,6-bis(phenylsulfonic acid)-1,2,4-triazine. This solution has an iron rust and oxide dissolving ability many times greater than the dilute hydrochloric acid which is traditionally used. It is also capable of developing an accurate iron test in water analysis for ordinary soluble iron and ordinary iron rust without even a necessity for heating the sample to which the reagent is added.

The following examples are illustrative of the present invention but are not in limitation thereof.

EXAMPLE 1

To illustrate the superior iron dissolving properties of the reagent of the subject invention, a comparison was made with a solubilizing agent which is widely used.

A 50 ml. sample of water containing suspended $Fe_3O_4$ (prepared by burning steel wool, pouring the resulting $Fe_3O_4$ powder into water, allowing the coarse particles to settle and then separating and using the water with the $Fe_3O_4$ suspended therein) was treated with 1 ml. of 1/1 concentrated HCl plus 0.1 grams of hydroxylammonium chloride reducing agent brought to boil and held at the boiling point of the solution for an extended period of time.

Another 50 ml. sample of water containing suspended $Fe_3O_4$ and prepared as hereinbefore described was treated with a reagent solution comprising 0.66 ml. 98 percent thioglycolic acid, 0.33 ml. concentrated ammonium hydroxide and 0.1 grams of the sodium salt of 3-(2-pyridyl)-5,6,bis(phenylsulfonic acid)-1,2,4-triazine. It was also brought to a boil and held at its boiling point for an extended period of time.

Portions of the first sample hereinbefore identified were taken at various times and a reagent formulation comprising 1 ml. of ammonium hydroxide - ammonium acetate (taken from a 1 liter solution consisting of 500 ml. of concentrated $NH_4OH$ and 250 grams of ammonium acetate) with 0.005 gms. of a ferroin reagent consisting of 1,10(ortho)phenanthroline added thereto.

The amount of the iron dissolved in the sample was then colorimetrically determined. The results are shown as curve A of FIG. 1.

Portions of the other sample were also taken at various times and the amount of iron dissolved at that time measured by the same colorimetric techniques. Curve B of FIG. 1 illustrates these results.

EXAMPLE 2

This example illustrates the increased water-dissolving properties when ammonium hydroxide serves as the buffering agent for the thioglycolic acid.

A series of 50 ml. samples of water containing suspended $Fe_3O_4$ (formed as in Example 1) were treated with 1 ml. of a reagent solution. Each sample was treated with a reagent containing 98 percent thioglycolic acid and a different amount of concentrated ammonium hydroxide together with 0.010 grams of the sodium salt of 3-(2-pyridyl)-5,6,bis(phenylsulfonic acid)-1,2,4-triazine. The various solutions were brought to boiling and the parts per million of the ferrous iron were determined colorimetrically after the solution had been allowed to boil for 10 minutes. The results are shown in FIG. 2.

EXAMPLE 3

To further illustrate the superior iron dissolving properties of the reagent of the subject invention set forth in Example 1, another comparison was made with the solubilizing agent used therein.

A 250 ml. sample of water containing suspended $Fe_3O_4$ (prepared by burning steel wool, pouring the resulting $Fe_3O_4$ powder into water, allowing the coarse particles to settle and then separating and using the water with the $Fe_3O_4$ suspended therein) was treated with 5 ml. of 1/1 concentrated HCl plus 0.5 grams of hydroxylammonium chloride reducing agent and held at the boiling point of the solution for an extend period of time.

Another 250 ml. of the same sample was treated with 5 ml. of a solution comprising two parts by volume 98 percent thioglycolic acid and one part by volume of concentrated ammonium hydroxide. It was also held at its boiling point for an extended period of time.

The amount of iron dissolved and reduced to the ferrous ion was colorimetrically measured by the use of a ferroin reagent consisting of 1,10-phenanthroline at various times. The results are shown in Table 1:

TABLE 1

| Time in Minutes | 5 ml 1:1 HCl + 0.5 g $NH_2OH$ HCl/250 ml | 3.33 ml 98% thioglycolic 1.67 ml Conc. $NH_4OH$/250 ml sample |
|---|---|---|
| 1 | 0.0 ppm $Fe^{++}$ Found | 0.17 ppm $Fe^{++}$ Found |
| 3 | 0.0 | .31 |
| 8 | 0.0 | .56 |
| 9 | 0.0 | .68 |
| 30 | 0.0 | .89 |
| 50 | .02 | 1.02 |
| 68 | .02 | 1.11 |
| 150 | .03 | 1.19 |

EXAMPLE 4

This example further illustrates the increased water dissolving properties when ammonium hydroxide serves as the buffering agent for the thioglycolic acid which was shown in Example 2.

A series of 250 ml. samples of water containing suspended $Fe_3O_4$ (formed as in Example 1) were treated with 5 ml. of a reagent solution. Each sample was treated with a reagent containing 98 percent thioglycolic acid and a different amount of concentrated ammonium hydroxide. The various solutions were brought to boiling and the parts per million of the ferrous ion was determined as in Example 3 after the solution had been allowed to boil for 10 minutes.

The results are shown in Table 2:

TABLE 2

| % Thioglycolic Acid | % $NH_4OH$ | ppm $Fe^{++}$ dissolved |
|---|---|---|
| 100 | 0 | 0.83 ppm found |
| 83 | 17 | 0.84 |
| 71 | 29 | 1.20 |
| 62 | 38 | 0.93 |
| 55 | 45 | 0.90 |
| 50 | 50 | 0.32 |

Thus, as has been seen, the present invention provides a single reagent solution which is capable of solubilizing the iron in a test sample, reducing the iron to its ferrous form, buffering the sample solution to a predetermined pH and forming a color complex with the iron present. The reagent solution has an iron rust and oxide dissolving ability many times greater than dilute hydrochloric acid which is traditionally used and is capable of developing an accurate iron test in water analysis for ordinary soluble iron and ordinary iron rust without even a need for heating the sample at all. In addition, the reaction mixture can be used over extended periods without any deterioration. While the reagent solution of the present invention may, of course, be employed for laboratory analyses, if finds particularly advantageous use when employed in connection with various commercial continuous analyzers.

I claim as my invention:

1. A method of quantitatively determining the presence of iron in a sample solution which comprises adding to a sample solution a single reagent formulation consisting essentially of thioglycolic acid present in an amount sufficient to dissolve the iron compounds in the sample solution and reduce the iron to its ferrous form, a buffer to maintain a solution of the reagent and sample solution at a predetermined pH and a ferroin reagent present in an amount effective to form a colored complex with the ferrous iron in the reagent sample solution at the pH level allowing the colored complex to form and thereafter colorimetrically determining the amount of iron in the sample.

2. The method of claim 1 wherein, by volume, one part of the reagent formulation is combined with from about 25 to about 50 parts of the sample.

3. A reagent formulation for use in the spectrophotometric analysis of iron in a test sample solution which consists essentially of thioglycolic acid present in an amount sufficient to dissolve the iron compounds in the test sample solution and reduce the iron to its ferrous form, a buffer to maintain a solution of the reagent and test sample solution at a predetermined pH and a ferroin reagent present in an amount effective to form a colored complex with the ferrous iron in the reagent-test sample solution at the pH level, said reagent formulation being capable of addition to the test sample solution as a single reagent to develop an accurate analysis for iron.

4. The reagent formulation of claim 3 wherein, by volume, the thioglycolic acid is present in an amount of from about 55 to about 80 parts and the buffer is present in an amount of from about 20 to about 45 parts.

5. The reagent formulation of claim 3 wherein the ferroin reagent is present in an amount of from about 2 to about 10 gms./liter of the reagent solution.

6. The reagent of claim 3 wherein the buffer is ammonium hydroxide.

7. The reagent formulation of claim 6 wherein, by volume, the thioglycolic acid is present in an amount of from about 55 to about 80 parts and the ammonium hydroxide buffer is present in an amount of from about 20 to about 45 parts.

8. The reagent formulation of claim 3 wherein the ferroin reagent is a salt of 3-(2-pyridyl)-5,6-bis(phenylsulfonic acid)-1,2,4-triazine, the salt being a member selected from the group consisting of monosodium, disodium, monopotassium, dipotassium, monoammonium, diammonium and mixtures thereof.

9. The reagent formulation of claim 8 wherein the salt comprises disodium.

10. The reagent formulation of claim 8 wherein the buffer is ammonium hydroxide.

* * * * *